United States Patent
Schroeder et al.

(10) Patent No.: US 7,292,179 B2
(45) Date of Patent: Nov. 6, 2007

(54) INSTANTANEOUS PASSIVE RANGE FINDING

(75) Inventors: Wayne K. Schroeder, Mansfield, TX (US); Brett A. Williams, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 291 days.

(21) Appl. No.: 11/103,380

(22) Filed: Apr. 11, 2005

(65) Prior Publication Data
US 2006/0227039 A1 Oct. 12, 2006

(51) Int. Cl.
G01S 13/08 (2006.01)
G01S 13/86 (2006.01)

(52) U.S. Cl. .................. 342/118; 342/145; 342/146; 342/126; 342/133; 342/139; 342/140; 342/141; 342/156; 342/149; 342/153; 342/52; 342/54; 342/53; 342/56; 356/3.08; 356/4.06; 356/139.04

(58) Field of Classification Search ............ 342/52–56, 342/118, 126–141, 145, 146, 149, 153, 156; 356/3.08, 4.06, 139.04
See application file for complete search history.

(56) References Cited

U.S. PATENT DOCUMENTS 3,047,864 A * 7/1962 Byatt ........................ 342/435

(Continued)

FOREIGN PATENT DOCUMENTS

EP 0982559 3/2000

(Continued)

OTHER PUBLICATIONS

International Search Report PCT/US06/011107 dated Aug. 23, 2006.

(Continued)

*Primary Examiner*—John B. Sotomayor
(74) *Attorney, Agent, or Firm*—William, Morgan & Amerson, P.C.

(57) ABSTRACT

A method and apparatus for use in determining the range in a single time sample from a platform to a target are disclosed. The method includes receiving radiation emanating from the target at two points on the platform in a common time sample; detecting the received radiation and generating a signal representative thereof; and processing the signal. The signal is processed to determine a respective angle to target from two points on the platform by using a correlation between received signal amplitude and respective angle; and determine the range from the platform to the target from the respective angles and the separation distance between said two points in a single signal-to-noise sufficient sample. The apparatus includes a plurality of optical channels through which the apparatus can receive radiation emanating from the target, the optical channels and a plurality of electronics. The optical channels include a windowing system through which the radiation is received; a sensor capable of detecting the received radiation and generating a signal representative thereof; and a light tube between the windowing system and the detector. The electronics are capable of processing the signal in accordance with the method set forth above.

36 Claims, 9 Drawing Sheets

U.S. PATENT DOCUMENTS

| | | | | |
|---|---|---|---|---|
| 3,231,890 | A * | 1/1966 | Hoover | 342/428 |
| 4,845,502 | A * | 7/1989 | Carr et al. | 342/430 |
| 5,365,184 | A * | 11/1994 | Callender et al. | 327/2 |
| 5,933,106 | A * | 8/1999 | He et al. | 341/116 |
| 6,801,152 | B1 * | 10/2004 | Rose | 342/13 |
| 2004/0027257 | A1 * | 2/2004 | Yannone et al. | 340/945 |
| 2006/0038977 | A1 * | 2/2006 | Williams | 356/28.5 |
| 2006/0060761 | A1 * | 3/2006 | Williams | 250/221 |
| 2006/0124838 | A1 * | 6/2006 | Baker et al. | 250/221 |
| 2006/0227039 | A1 * | 10/2006 | Schroeder et al. | 342/118 |

FOREIGN PATENT DOCUMENTS

| | | |
|---|---|---|
| WO | 2004/001333 | 12/2003 |

OTHER PUBLICATIONS

"Passive Ranging with AN Incoherent Optical System." by Dowski, 1993, University of Colorado.

"A Modified Method of Passive Ranging Using Optical Flow of Target Infrared Images." by Huang, et al, 2005, The International Society for Optical Engineering.

"Passive Range Measurement Through Wavefront Coding." by Lis, 2006, International Society for Optical Engineering.

"Wavefront Optimization."

"Heterodyne Holographic Interferometry: High-Resolution Ranging and Displacement Measuremant." by Wagner, 1988.

* cited by examiner

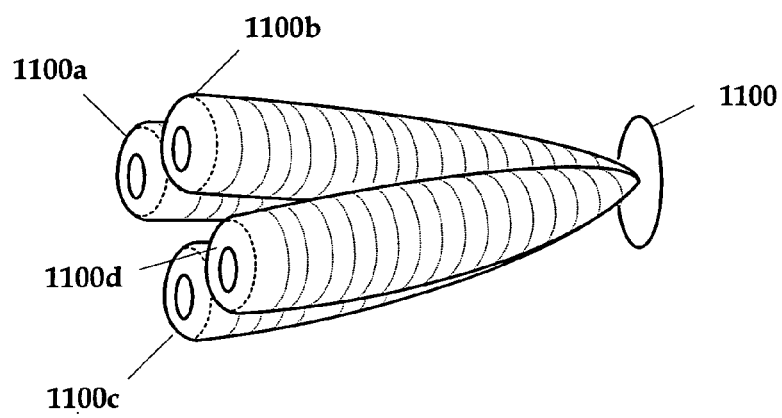
FIG. 11
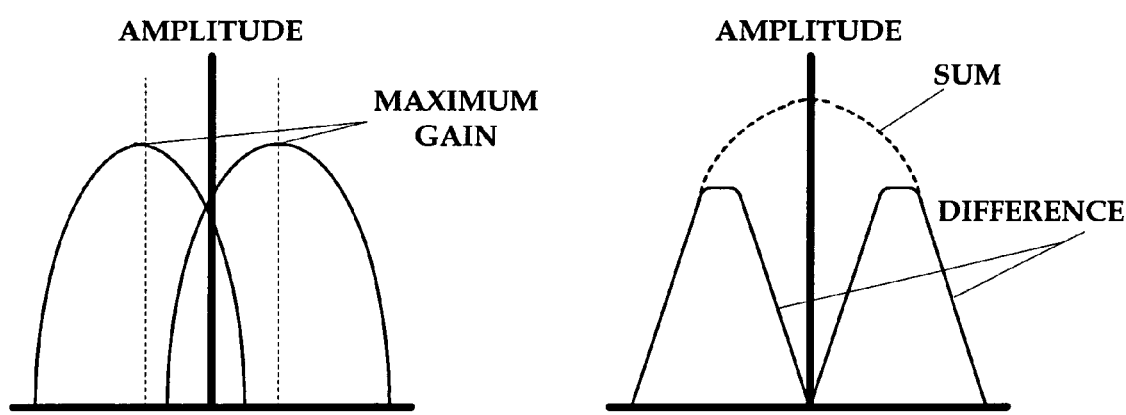
FIG. 12
FIG. 13

INSTANTANEOUS PASSIVE RANGE FINDING

BACKGROUND OF THE INVENTION

1. Field of the Invention

The present invention pertains to remote sensing, and, more particularly, to passive range finding with measurements in a single time sample.

2. Background of the Invention

A significant need in many contexts is to determine the relative position between two objects. For instance, in a military context, it may be desirable to determine the relative distance along a line-of-sight or range from a vehicle to a target. Several methods have been used to determine the range to a target with electromagnetic waves. The most common is to actively transmit a pulse of electromagnetic energy that travels at the speed of light and record the time at which the reflected pulse returns. Since the speed of this energy is the constant speed of light, this constant velocity multiplied by half the measured time difference would give the range between the target and the vehicle generating the energy pulse.

This is the basis for RADAR, which is an acronym for Radio Detection And Ranging. Laser range finders operate on the same fundamental principle but at a higher frequency of electromagnetic radiation. This approach is known as an active approach since it requires the active participation of the vehicle in generating the electromagnetic pulse so that the time and location of the transmitted energy source is known. This active approach may not be desirable in some contexts due to the cost of the radiating source. In other contexts, the active approach may not be desirable due to the expulsion of radiating energy betrays efforts to be stealthy.

A traditional method to passively measure range involves receiving a signal from a target radiating energy over time. Multiple measurements are required over time while the relative geometry between the target and the passive-sensing vehicle are changing. Accounting for the time differences in the trajectory path, the range of the target can be calculated through triangulation. The radiated energy returned from the target can be generated by the target or the target can be illuminated by a remote source where the location and time of energy generation is unknown.

A distinguishing feature of this approach is that multiple measurements are required over a period of time with changing geometry. If the sensing vehicle travels directly toward the target or at a constant bearing relative to the target, the relative range is unobservable using the traditional passive approach. This passive approach may not be desirable in some contexts due to the time required to travel a trajectory necessary for triangulation. In other contexts, the passive approach may not be desirable due to the inefficiency of the trajectory required for triangulation or the non-constant bearing trajectory.

The present invention is directed to resolving, or at least reducing, one or all of the problems mentioned above.

SUMMARY OF THE INVENTION

The invention includes, in its various aspects and embodiments, a method and apparatus for use in determining the range in a single time sample from a platform to a target. The method comprises receiving radiation emanating from the target at two points on the platform in a common time sample; detecting the received radiation and generating a signal representative thereof; and processing the signal. The signal is processed to determine a respective angle to target from two points on the platform by using a correlation between received signal amplitude and respective angle; and determine the range from the platform to the target from the respective angles and the separation distance between said two points in a single signal-to-noise sufficient sample. The apparatus comprises a plurality of optical channels through which the apparatus can receive radiation emanating from the target, the optical channels and a plurality of electronics. The optical channels include a windowing system through which the radiation is received; a sensor capable of detecting the received radiation and generating a signal representative thereof; and a light tube between the windowing system and the detector. The electronics are capable of processing the signal in accordance with the method set forth above.

BRIEF DESCRIPTION OF THE DRAWINGS

The invention may be understood by reference to the following description taken in conjunction with the accompanying drawings, in which like reference numerals identify like elements, and in which:

FIG. 11-FIG. 13 illustrate one particular embodiment in which radio frequency signals rather than optical signals are employed in remotely sensing the field of view.

Figure 1:
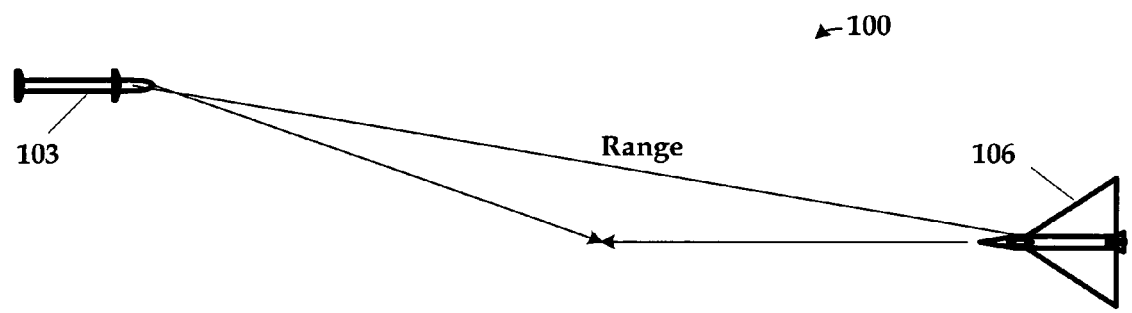
FIG. 1 conceptually illustrates one particular scenario in which a sensing vehicle may employ the present invention to determine position of a target in the presence of countermeasures or other obstacles.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF A SPECIFIC EMBODIMENT

The present invention involves instantaneously determining the relative range from a set of measurements obtained in a single time sample. More specifically, the invention involves determining the range using separate measurements of the relative angles to the target generated by two or more sensors simultaneously. The invention is independent of the type of electromagnetic energy used.

Sensors are able to sense the intensity of electromagnetic radiation emanating from a target. This radiated energy can be generated by the target or reflected by the target from an illuminating source. By normalizing the signal intensity of each sensor by the sum of the two sensors, a separate angle measurement can be generated from each independent sensor. These separate angle measurements can be used in combination with the distance between the two sensors to calculate the range to the target. The process of normalizing the signal intensity makes the range measurement independent of signal strength from the target. The relative angle to the target can also be calculated by measuring the difference in sensed intensity between two sensors in a method called Non-Coherent Fresnel Direction Finding ("NCFDF"). This method of measuring angle is disclosed and claimed in U.S. patent application Ser. No. 10/729,066, entitled "Non-Coherent Fresnel Direction Finding Method and Apparatus," filed Dec. 5, 2003, in the name of inventors Brett A. Williams, et. al. ("the NCFDF application"), which is hereby incorporated by reference for all purposes as if set forth verbatim herein. This application issued Feb. 8, 2005, as U.S. Pat. No. 6,851,645 and is commonly assigned herewith.

Using the angles generated by each separate sensor and those generated by the combination of sensors (using NCFDF), multiple range calculations can be generated by the sample measurements in a single time step. A distinguishing feature of this invention is that the sensing vehicle can be on a constant bearing trajectory to the target and passively generate a range measurement. An additional distinguishing feature is that this range calculation can be performed with the measurements taken in a single time step. An additional distinguishing feature is that multiple range calculations can be made from the set of angle measurements and at least one baseline between sensors.

A range measurement can be calculated with the inventive approach using two angle measurements and a separating baseline. Since each sensor can effectively provide an independent angle measurement, the baseline between the sensors can be used for this range measurement. Since the NCFDF approach provides an angle measurement correlated with the mid-point of the baseline, an additional range measurement can be made using the NCFDF angle, a single sensor and a baseline defined by the midpoint of the line between the sensors and the distance to the sensor. In a similar manner, a third range measurement can be generated with the NCFDF angle and the remaining sensor angle. It follows that three angle measurements from the two sensors and the NCFDF approach and the baselines defined by the separation distance between the two sensors and the separation distances between the midpoint and each sensor can be used to produce three range measurements. In this manner, the inventive approach produces three range measurements instantaneously for each baseline between two sensors.

The use of three sensors produces three baselines and therefore is able to produce nine range measurements. The use of four sensors can produce six baselines between the sensors and eighteen range measurements. The use of five sensors can provide nine baselines and twenty-seven range measurements. It can be seen that the number of sensors can be increased to any finite number and the number of range measurements will be three times the number of unique baselines able to be described between the sensor elements.

The inventive concept is independent of the alignment of the sensors with each other. The baselines between the multiple sensors do not have to be orthogonal to each other. The multiple baselines do not have to be orthogonal to the host vehicle.

As the target approaches a position aligned with boresight, a singularity can occur due to the processing of the signal returns. This can be remedied through a combination of methods. The derivation of the range measurements in Euler angles can yield a singularity in the equations at the line-of-sight angle to the target becomes perpendicular to the baseline between two sensors. In this region very near perpendicular, an alternative formulation of the range equations can be used. In practice, one would input the raw angle measurements into an estimation filter (not shown), such as a Kalman filter. The correlation between the angle measurement and the angle could be learned or estimated by the filter so that if the nose passed through boresight, one may not have to use the alternative equations to cover the singularity point. This inventive concept could also be implemented by formulating the range equations by using quaternions or directional cosines.

As those versed in the art having the benefit of this disclosure will appreciate, a missile does not typically fly along a boresight angle to a target. Most guidance algorithms put a missile on a trajectory with a non-zero bearing to the target. Proportional navigation is an example of a common guidance law used with missiles. This guidance law drives the missile toward a constant non-zero bearing toward a target.

It is also possible to formulate the angular relationships using the direct voltages from the signal returns from the sensors. While for this example they are described in Euler angle space, it would be possible to correlate the voltage amplitude directly to angular space in Euler, quaternion or directional cosine space and use the inventive approach to determine range. The normalization of the signal returns makes the amplitude invariant to range or signal fluctuations so that range is determined by the parallax between the sensors. It is possible to augment the inventive approach with an estimation filter so that the signal amplitudes are measured and correlated with the range determined by the inventive approach and subsequently upon filter convergence, the raw signals can be used to output range. This is another method to ensure accurate measurements as the missile and target pass through a boresight angle of zero.

The benefits of the inventive approach are a much more rapid determination of range that can be crucial in time critical application such as a military engagement. An additional benefit of the invention is a more cost effective approach to range determination particularly in the context of active approaches and the necessary radiating components.

One illustrative embodiment of the invention is described below as it might be implemented as a missile seeker to aide in guidance toward a target. In the interest of clarity, not all features of an actual implementation are described in this specification. It will be appreciated that in the development of any such actual implementation (as in an missile seeker design development effort). Numerous implementation-specific decisions must be made to achieve the designer's specific goals, such as compliance with system- and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, the invention can be used in a military application for finding the range between a sensing vehicle and a target. FIG. 1 illustrates a scenario 100 in which a platform 103 is sensing the range to a target 106 on an intercept course. As a first embodiment, the invention will be described in terms of sensors receiving electromagnetic energy in the optical wavelengths or more specifically in the infrared wavelengths. The invention is able to determine the range between the platform 103 and the target 106 by utilizing multiple sensors on the body of the platform 103.

Figure 2:
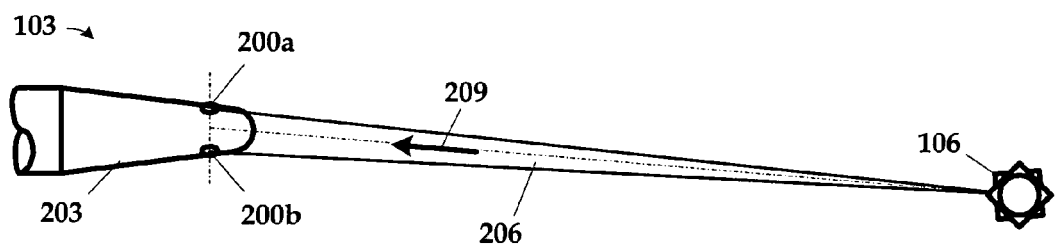
FIG. 2 illustrates the reception by the sensing vehicle of FIG. 1 of energy emanating from the environment in accordance with one particular embodiment of the present invention.

FIG. 2 illustrates a configuration of two sensors 200a, 200b on the nose 203 of the platform 103. Note that the number of sensors used will be implementation specific and that the number of sensors is not material to the practice of the invention so long as there are at least two. FIG. 2 also illustrates the radiated energy 206 emanating from the target 106 to the platform 103, as indicated by the arrow 209.

Figure 3A:
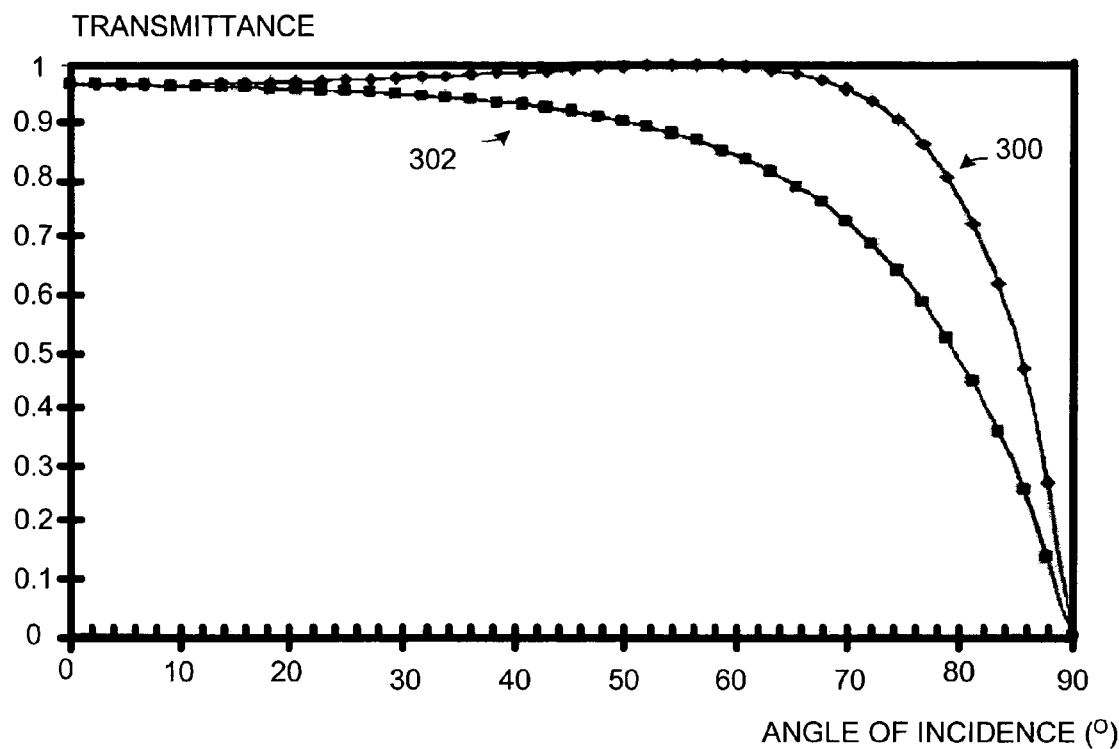
FIG. 3A illustrates the relationship between angle of incidence and transmission of radiation impinging on the windows of an optical channel in a radome of the present invention in what is known as Fresnel transmittance curves.

As the target 106 changes location relative to the platform 103, the magnitude of the received electromagnetic energy changes with relative angle between the target 106 and the platform 103. For radiated energy passing through a window component in the sensor, this signal amplitude and angle correlation is show in FIG. 3A. The curves 300, 302 shown in FIG. 3A are known as the Fresnel transmittance curves, given for both perpendicular and parallel polarization. The top curve 300 is parallel polarization. The curves 300, 302 represent the measure of transmission through the first interface of a flat medium with higher index of refraction than that of the incident medium. Polarization is defined with respect to a plane containing the surface normal and the incident light ray. Transmission efficiency appears high with nearly all incident energy transmitted between 0° and 60° incidence. Beyond 60°, a strong reduction in transmitted energy is seen with increasing incident angle. This is the region manipulated by the invention for direction finding purposes.

Figure 3B:
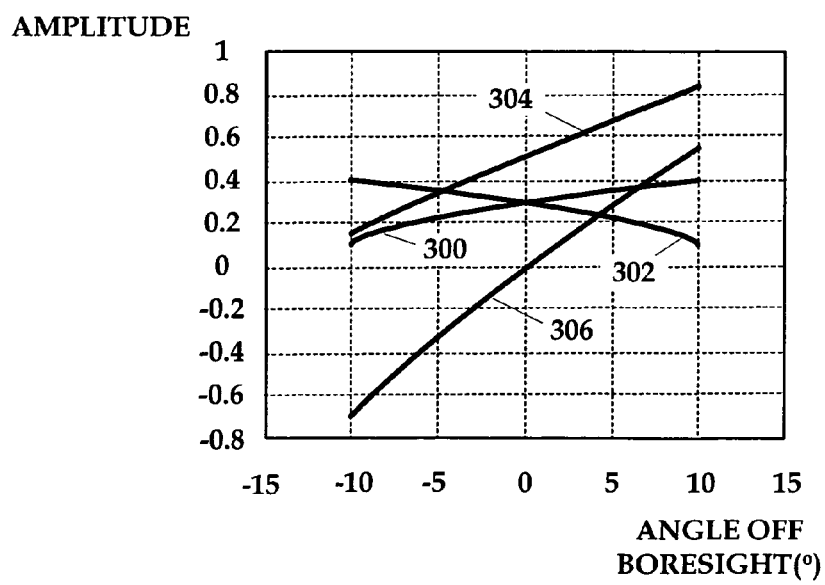
FIG. 3B shows a pair of opposing window amplitude responses, the Beta curve which results from the division of their difference by their sum, and the "window reconstruction curve" ("WRC") derived therefrom.

Each sensor 200a, 200b receives the radiated energy 206 from the target 106 in relation to the orientation of the window thereof relative to the target 106. FIG. 3B illustrates the relationship between the normalized magnitude of the radiated energy 206 and window orientation. This Fresnel transmittance curves for each sensor are shown as the responses 300, 302 in FIG. 3B.

More particularly, FIG. 3B illustrates the detection signals of an opposing pair of radiation sensors, the sensors 200a, 200b in FIG. 2. As an example, curve 300 corresponds to the detection signal of the top radiation sensor 200a and curve 302 corresponds to the detection signal of the bottom radiation sensor 200b. In this instance, the detection signal 300 of the left radiation sensor 200a is strongest when the radiation pulse is incident at an angle to the left off boresight and continuously decreases as the radiation pulse is incident at angles increasingly to the right off boresight. This decrease in the left detection signal 300 is due to the decreasing Fresnel transmittance as the angle of incidence increases from left off boresight to right off boresight.

Separate angle measurements are able to be calculated using the measurements from each sensor 200a, 200b by normalizing the energy return from each sensor 200a, 200b by the sum of the returns 300, 302. In this manner a window reconstruction curve 304 can be generated as shown in FIG. 3B. The window reconstruction curve 304 is actually three curves overlaid upon each other. These curves are generated by the division of a single window amplitude output normalized (divided) by the sum of both window amplitudes for three conditions—a unity value, 3 dB down and −6 dB. These overlaid curves illustrate that no matter the signal strength variation, the single window reconstruction curve 304 can be found making use of the sum and it is stable pulse-to-pulse over time. Each window for each sensor 200a, 200b will have its own window reconstruction curve. FIG. 3B also illustrates the Beta curve 308 which results from the division of the difference between the responses 300, 302 by their sum.

Figure 4:
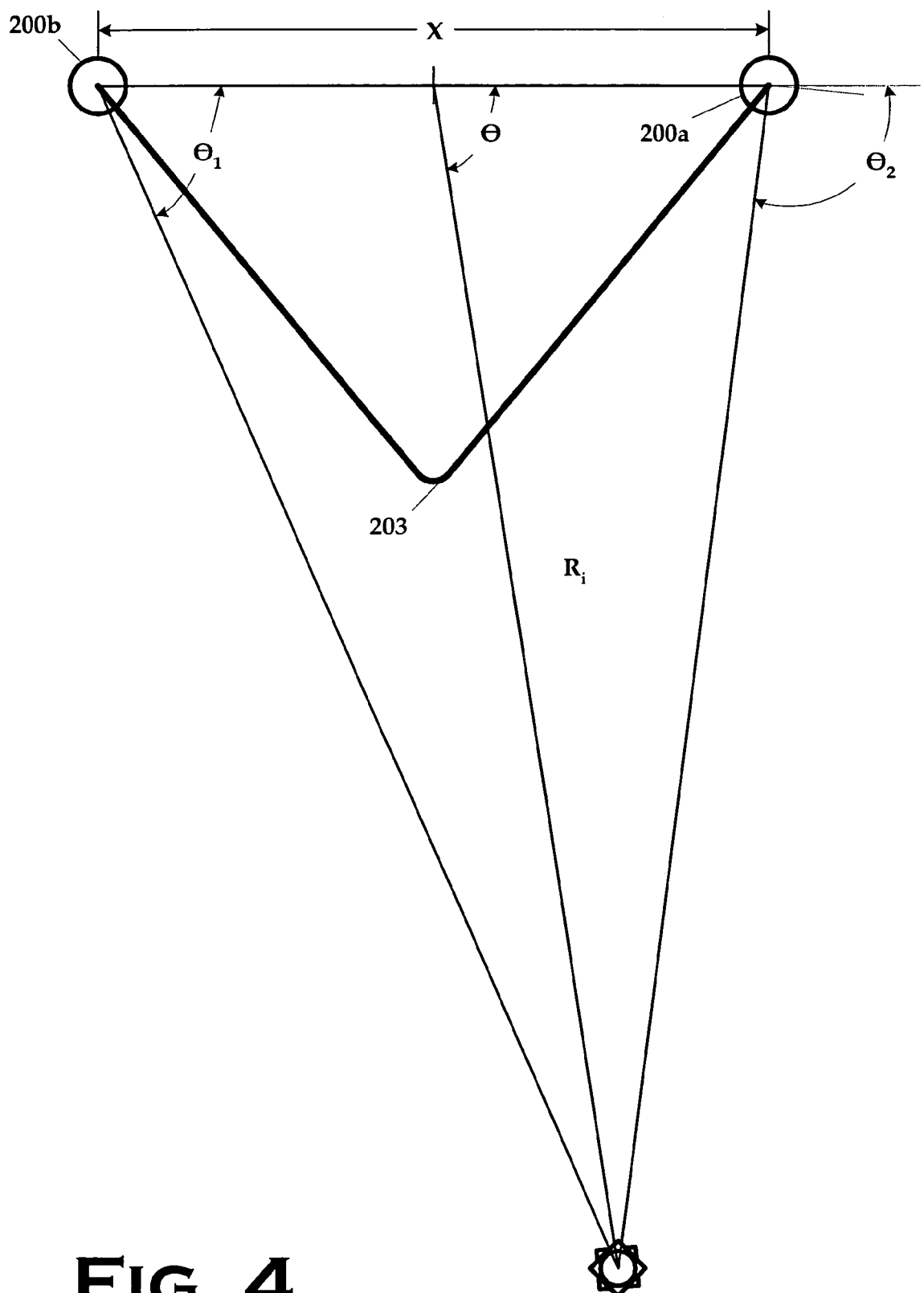
FIG. 4 illustrates several quantities employed in the determination of the range from the platform to the target.

Referring now to FIG. 4, from the window reconstruction curve 304 in FIG. 3B, the window of each sensor 200a, 200b is able to determine the angle to the target relative to each sensor 200a, 200b. Using these separate angles, the range representing the use of the baseline length between the two sensors can be calculated by the formula:

$$R_3 = \frac{x}{2\cos\theta_2}\left[\frac{\sin^2\theta_2 - \sin^2\theta_1}{\sin^2(\theta_2 - \theta_1)} - 1\right] \qquad \text{Eq. (1)}$$

The angle between the platform 103 and the target 106 is also able to be determined using the method and apparatus described in the NCFDF application referenced above. By this method, the two sensors 200a, 200b are used in combination to produce a single angle measurement θ as shown in FIG. 4. This angle measurement θ is relative to the center of the distance between the two sensors. Using this additional angle measurement θ and the individual window angle measurements $\theta_1$, $\theta_2$, two more range calculations are achievable.

$$R_1 = \frac{x}{2}\left[\frac{\sin\theta_1}{\sin(\theta - \theta_1)}\right] \qquad \text{Eq. (2)}$$

$$R_2 = \frac{x}{2}\left[\frac{\sin\theta_2}{\sin(\theta_2 - \theta)}\right] \qquad \text{Eq. (3)}$$

Each of $R_1$, $R_2$, $R_3$ is one distinct, independent measure of the true range, $R_i$. When θ approaches or is at 90°, the equations for $R_1$ and $R_2$ approach a singularity due to the Euler angle formulation. These equations can be put into a form as this region is approached that does not have the singularity:

$$R_1 = \frac{x}{2}[\tan\theta_1] \qquad \text{Eq. (4)}$$

$$R_2 = \frac{x}{2}[\tan(\pi - \theta_2)] \qquad \text{Eq. (5)}$$

Note that the units of measurement used in any particular implementation are not material to the practice of the invention. The illustrated embodiment employs range equations based on angles described in Cartesian coordinates. However, in alternative embodiments, the angles may be described in quaternion coordinates, polar coordinates, a rotated frame, or unit vectors, or directional cosines might be used.

Each of the determinations $R_1$, $R_2$, $R_3$ may also be slightly different due to a number of factors. In some embodiments, any one of $R_1$, $R_2$, $R_3$ may be used to determine the range $R_i$ from the platform to the target. In other embodiments, more than one determination $R_1$, $R_2$, $R_3$ may be used. For instance, the illustrated embodiment filters all three of $R_1$, $R_2$, $R_3$ through a conventional Kalman filter. Since Kalman filters are well known in the art, further discussion of them will be omitted. Alternative embodiments may, for instance, average or take the median of two or three determinations.

Figure 5:
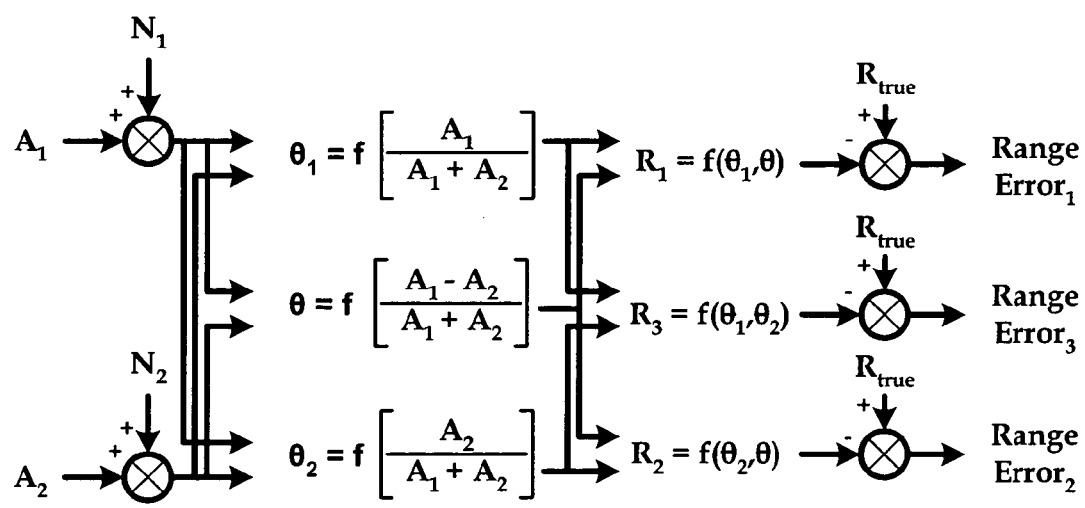
FIG. 5 illustrates how the range and angles to the target are measured.
Figure 6A:
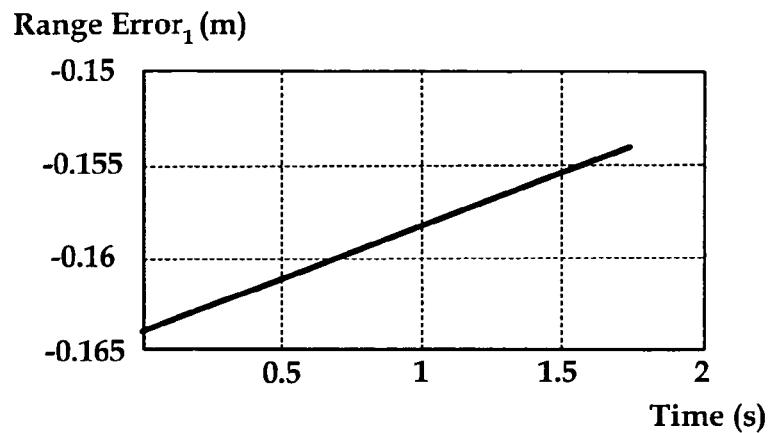
FIG. 6A-FIG. 6C depict simulation results of the determination in FIG. 5 used to substantiate the illustrated embodiment.
Figure 6B:
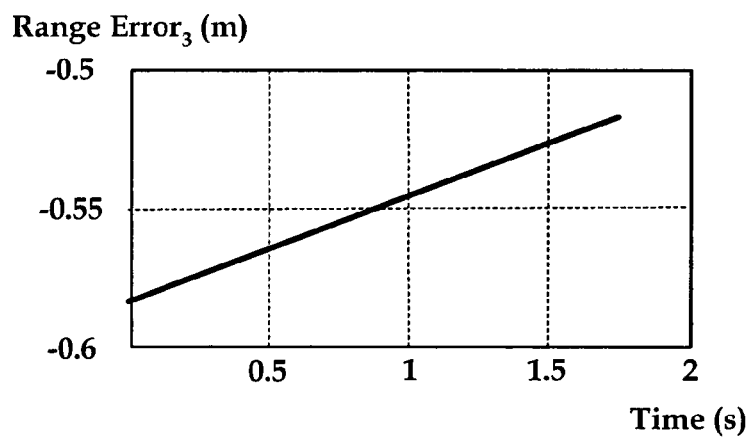
Figure 6C:
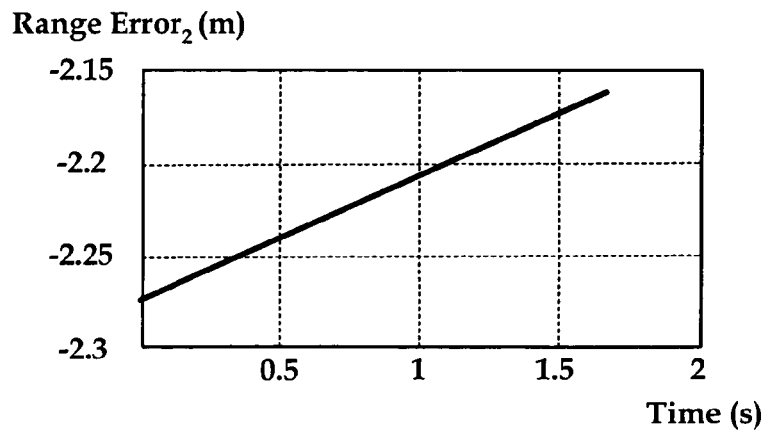
Figure 7:
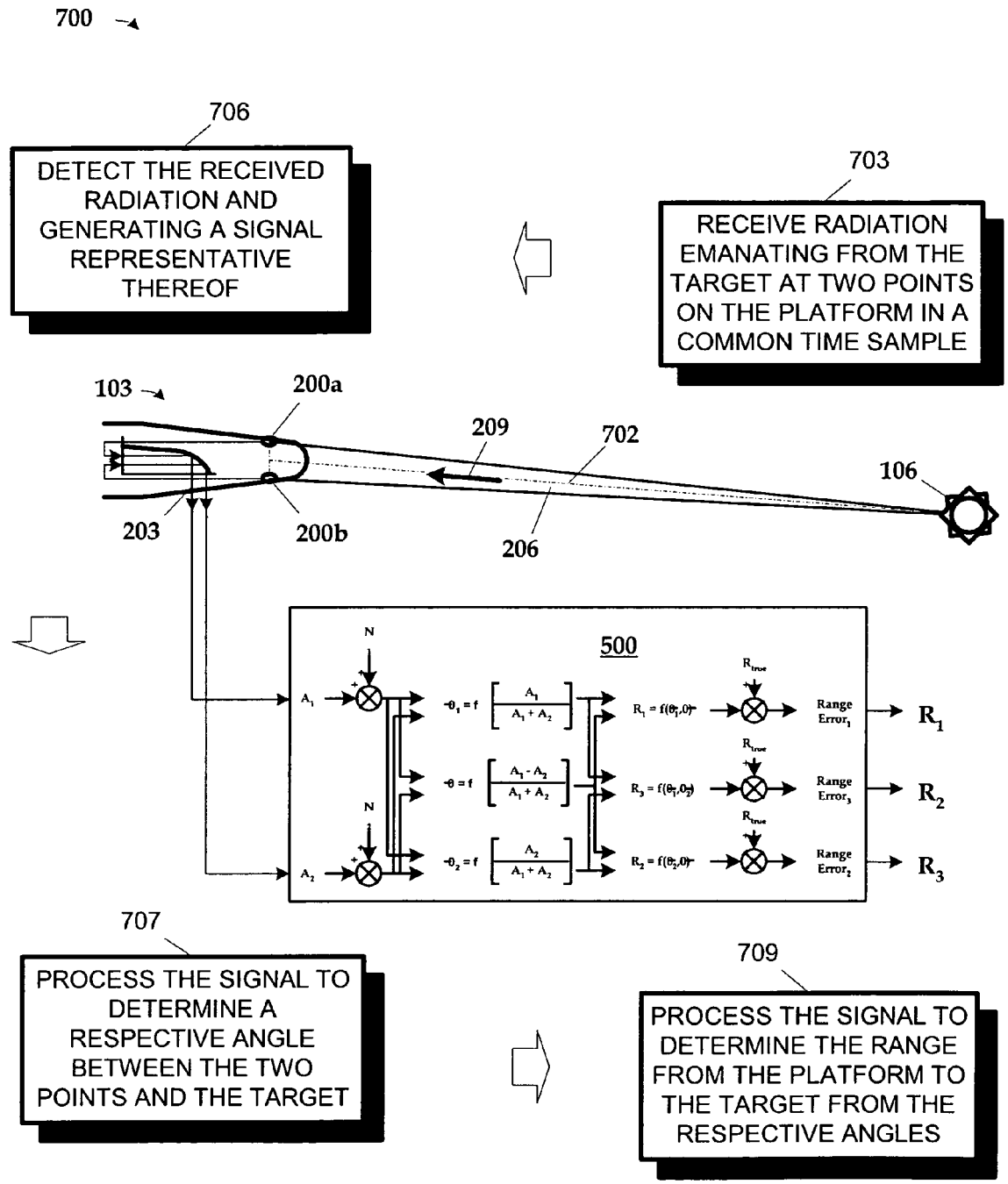
FIG. 7 illustrates a method practiced in accordance with one aspect of the present invention.
Figure 8A:
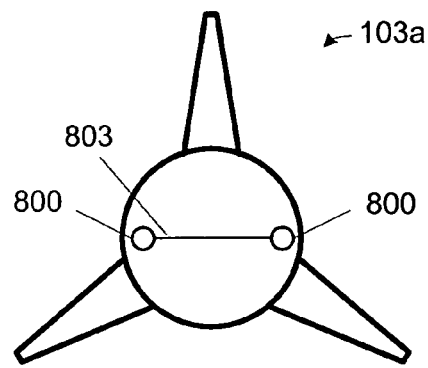
FIG. 8A-FIG. 8D illustrate alternative sensor numbers and geometries for use in alternative embodiments.
Figure 8B:
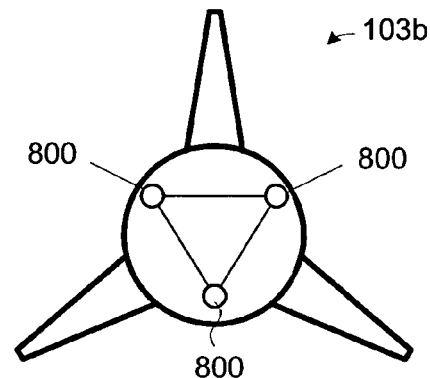
Figure 8C:
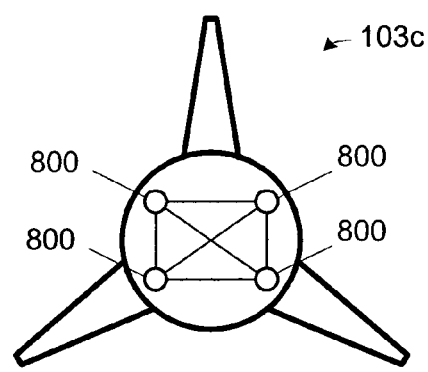
Figure 8D:
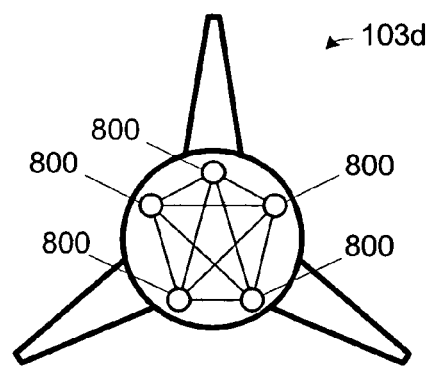

One particular embodiment is a missile seeker being used to target a hot object on a target such as a plume or hot engine. In this embodiment, the sensors 200a, 200b are mounted in the nose 203 of the missile. In accordance with the illustrated embodiment of the present invention, the sensors 200a, 200b do not require a hemispherical dome commonly used with IR seekers. The range and angles to the target are measured in accordance to the block diagram 500 in FIG. 5. FIG. 6A-FIG. 6C depict simulation results and more particularly the errors in range measurement used to substantiate this embodiment. In FIG. 5:

$A_1$ ≡ a signal representative of the radiation received by a first sensor, e.g., the sensor 200a, i.e., the signal output by the first sensor;

$A_2$ ≡ a signal representative of the radiation received by a second sensor, e.g., the sensor 200b, i.e., the signal output by the second sensor;

$N_1$ ≡ noise through the system associated with the first signal A1 (for example, optical noise through the window and signal noise associated with the sensor and any other noise picked up before it goes into the denoted calculation);

$N_2$ ≡ noise through the system associated with the second signal A2

$R_1$ ≡ Eq. (2), above;

$R_2$ ≡ Eq. (3), above;

$R_3$ ≡ Eq. (1), above;

θ ≡ as illustrated in FIG. 4;

$θ_1$ ≡ as illustrated in FIG. 4;

$θ_2$ ≡ as illustrated in FIG. 4;

$Range_{true}$ ≡ the true range used for the simulation;

Range $Error_1$ ≡ the error in the first range measurement $R_1$ (True—measured);

Range $Error_2$ ≡ the error in the first range measurement $R_2$ (True—measured); and Range $Error_3$ ≡ the error in the first range measurement $R_3$ (True—measured).

Note that $A_1$ and $A_2$ are signals, and not angles. They are correlated to angles through the Fresnel transmission curve. They are then normalized:

$$\theta_1 = f\left[\frac{A_1}{A_1 + A_2}\right] \quad \text{Eq. (6)}$$

to give a relationship with angle that is invariant with signal strength, i.e., the window reconstruction curve from FIG. 3B.

The embodiment disclosed above is described in a single plane with two sensors and one baseline. Those in the art having the benefit of this disclosure will appreciate that the present invention can be applied in multiple planes with multiple sensors and multiple baselines in the sensor geometry. This has the effect of increasing the number of independent range calculations that can be performed. FIG. 8A-FIG. 8D illustrate vehicles 103a-103d employing 2, 3, 4, and 5 sensors, respectively, yielding 3, 9, 18, and 27 independent range measurement, respectively. The range measurements can be derived from the sensor pairings indicated by the undirected edges 803 (only one indicated). Thus, as is evident from FIG. 8A-FIG. 8D, the present invention admits variation in that, in various embodiments:

the sensors 800 and the baselines they define may be oriented orthogonally to the body axes of the platform;

the sensors 800 the baselines they define may not be oriented orthogonal to body axes of the platform;

the sensors 800 may not be aligned in a plane;

multiple sensors 800 over and above two may be used; and multiple distributed sensors 800 may be used in non-aligned baselines.

Note that some of these variations are mutually exclusive and, accordingly, not all of the features may be realized in all embodiments.

In the embodiment, the missile guides to the target using the angle and range measurements. The range specifically is used to improve a time-to-go estimate. The invention provides this range measurement. With a traditional passive approach, the missile trajectory would either be shaped to develop a range estimate over time by varying the relative angles to the target or the missile would guide without a range estimate. If an active approach were used, additional hardware would be required. As would be known to one skilled in the art, the ideal guidance approach is a constant bearing trajectory such as that commanded by augmented proportional navigation. This does not lend itself to the trajectory shaping of the traditional passive approach.

As the missile approaches the target, the relative range between the missile and the target decreases. FIG. 6A-FIG. 6C show the results of the range calculations in accordance with the present invention. It should be noted that a range estimate from traditional approaches could not be developed along this constant bearing trajectory. Furthermore, the range accuracy would be improved as these calculated range estimates were propagated through an estimation filter such as a Kalman Filter. For clarity of concept, the benefits of the estimation filter are separated from the inventive approach.

Thus, in one aspect, the present invention includes a method 700 for use in determining the range 702 from a platform 103 to a target 106. The method 700 comprises:

receiving (at 703) radiation 209 emanating from the target 106 at two points on the platform 103 in a common time sample;

detecting (at 705) the received radiation and generating a signal representative thereof;

processing the signal to:

determine (at 707) a respective angle between the two points and the target 106 by using a correlation between received signal amplitude and respective angle; and determine (at 709) the range 702 from the platform 103 to the target 106 from the respective angles.

Note that, as is apparent from the above discussion, the present invention admits wide variation in all these aspects.

The scenario 100 in FIG. 1 implements the present invention in a passive system. The received energy emanates from the field of view in which the target 106 is located, and is not necessarily a reflection of energy introduced into the field of view for that purpose. However, the embodiments in FIG. 9A-FIG. 9C may be used in semi-active as well as passive systems. In a semi-active system, an external, third party designator (not shown) designates the target 106 by directing a signal 127, typically an optical signal (e.g., a laser), at the target 106. The platform 103 then receives the signal 127 reflected by the target 106 in the same manner that it receives the energy in the passive system discussed above.

Figure 9A:
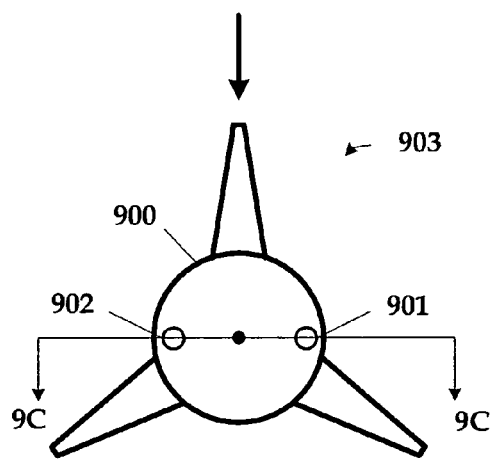
FIG. 9A-FIG. 9C depict one particular implementation of the platform in FIG. 1 in plan, head-on and partially sectioned side views, respectively, the view in FIG. 9C being taken along the line 9C-9C in FIG. 9A.
Figure 9B:
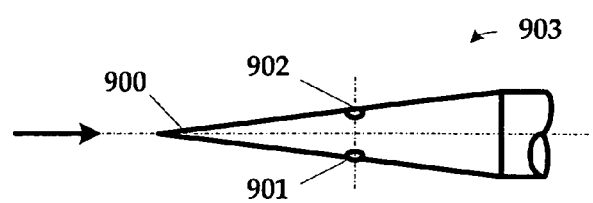
Figure 9C:
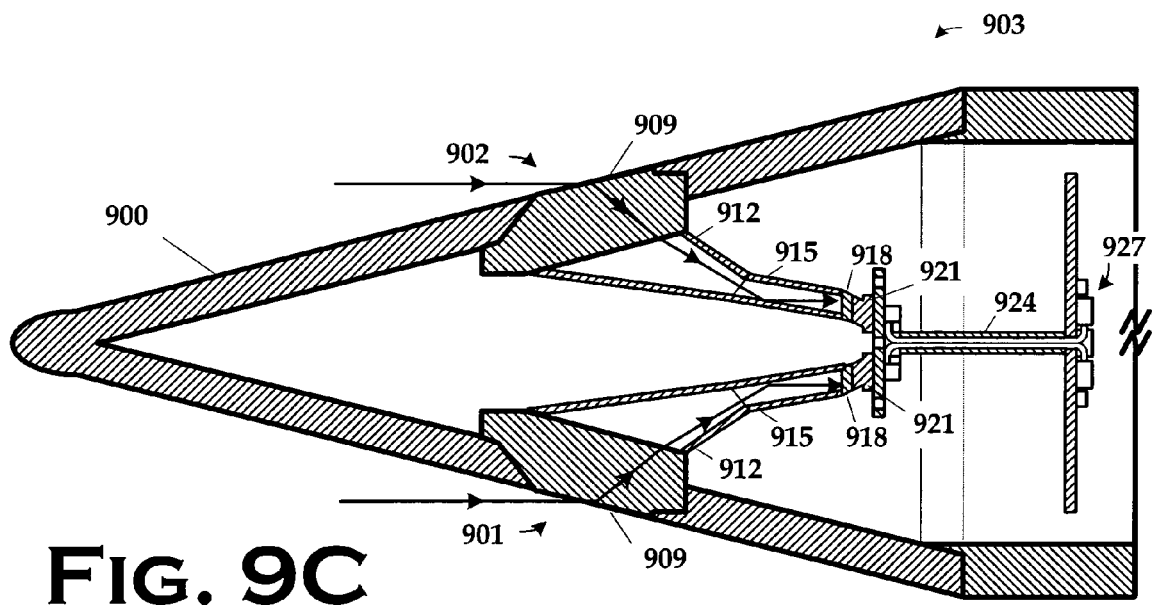

FIG. 9A-FIG. 9C depict one particular implementation 903a of the platform 103 in FIG. 1 in plan, head-on, elevational view; a plan, top, elevational view; and a partially sectioned, side view, respectively. The forward end of the platform 903a comprises a radome 900, in which at least two optical channels 901, 902 are situated on opposite sides of the radome 900, i.e., 180° apart as sensors. Each of the optical channels 901, 902 includes a separate, dedicated window 909, although alternative embodiments may implement the windows 909 collectively as a collar (not shown) extending around the perimeter of the radome 900. Each of the optical channels 901, 902 further includes a field of view limiter 912, a light pipe 915, a bandpass filter 918, and a detector 921. The field of view limiter 912 and light pipe 915 act as a waveguide to direct selected radiation transmitted through the windows 909 to the detectors 921 through the bandpass filters 918, as represented by the arrows 920. The bandpass filters 918 are optional, and help to limit the radiation bandwidth of each channel to limit noise in the data. In the illustrated embodiment, the detectors 921 comprise Silicon PIN photodetectors such as are well known in the art.

In both FIG. 9A-FIG. 9C, the detectors 921 are electrically connected through a wiring harness 924 to a plurality of electronics 927 that capture, store, and process the information output by the detectors 921. In the illustrated embodiment, the detectors 921 convert the analog radiation received through the optical channels 901, 902 into digital data. The wiring harness 924 transmits the resulting digital detection signals, one detection signal for each radiation detector 921, to the electronics 927. While some signal processing, such as noise reduction, may be done for each individual detection signal, the detection signals are summed and differenced to determine the relative direction from which the received radiation came.

Figure 10:
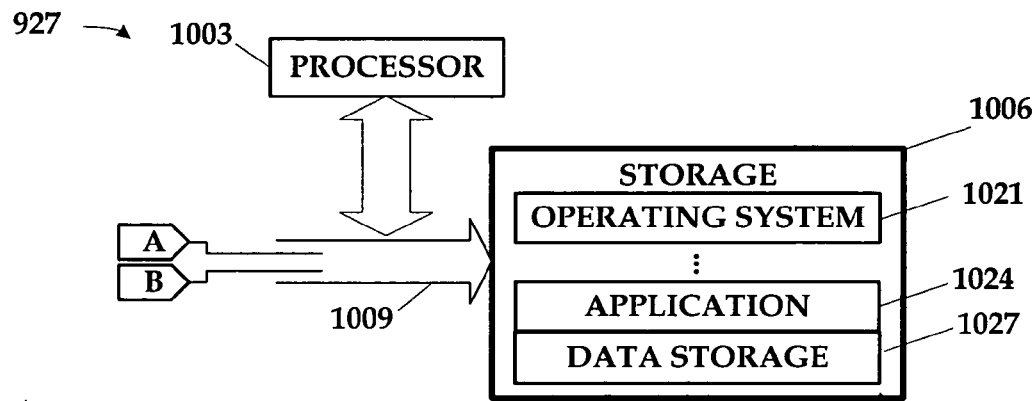
FIG. 10 depicts, in a block diagram, selected portions of the electronics of the implementation of FIG. 9A-FIG. 9C.

FIG. 10 depicts, in a conceptualized block diagram, selected portions of the electronics 927 with which certain aspects of the present invention may be implemented. The electronics 927 include a processor 1003 communicating with some storage 1006 over a bus system 1009. In general, the electronics 927 will handle lots of data in relatively short time frames. Thus, some kinds of processors are more desirable than others for implementing the processor 1005 than others. For instance, a digital signal processor ("DSP") may be more desirable for the illustrated embodiment than will be a general purpose microprocessor. In some embodiments, the processor 1003 may be implemented as a processor set, such as a microprocessor with a math co-processor.

The storage 1006 may be implemented in conventional fashion and may include a variety of types of storage, such as a hard disk and/or random access memory ("RAM") and/or removable storage such as a magnetic disk (not shown) or an optical disk (also not shown). The storage 1006 will typically involve both read-only and writable memory. The storage 1006 will typically be implemented in magnetic media (e.g., magnetic tape or magnetic disk), although other types of media may be employed in some embodiments (e.g., optical disk). The present invention admits wide latitude in implementation of the storage 1006 in various embodiments. In the illustrated embodiment, the storage 1006 is implemented in RAM and in cache.

The storage 1006 is encoded with an operating system 1021. The processor 1003 runs under the control of the operating system 1021, which may be practically any operating system known to the art. The storage 1006 is also encoded with an application 1042 in accordance with the present invention. The application 1024 is invoked by the processor 1003 under the control of the operating system 1021. The application 1024, when executed by the processor 1003, performs the process of the invention described more fully below. The storage 1006 includes a data storage 1027 comprising a data structure that may be any suitable data structure known to the art.

The inputs A-B in FIG. 10 represent the digital output of the detectors 921 for the optical channels 902, 904. The data received from the inputs A-B is stored in the data storage 1027. The processor 1003 operates on this data in the manner described more fully below to passively determine the range from the platform 103 to the target 106, both shown in FIG. 1. Note that this operation comprises the execution of the application, and is therefore software implemented.

Consequently, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Those in the art having the benefit will appreciate, however, that whether the system is passive or semi-active will have some implementation-specific ramifications. For instance, the received energy in a passive system will typically be of a different wavelength from that in a semi-active system. This, in turn, will affect the selection and implementation of, for instance, the bandpass filters 918 and radiation detectors 921 shown in FIG. 9A-FIG. 9C. The invention may also be implemented in an active system.

The illustrated embodiments discussed above rely on the Fresnel transmission characteristics of the optics they employ. However, this is not necessary to the practice of the invention. Even in embodiments using the Fresnel transmission characteristics, the optics should be calibrated due to optical impurities, etc. Alternative embodiments, might use conventional optics with lesser performance and correlate the angles in a table look-up. The look-up table could reside, for instance, in the data storage 1027 of the computing apparatus 1000 illustrated in FIG. 10.

The embodiments illustrated above have all been implemented in optical bands, e.g., visible, ultraviolet ("UV"), near infrared ("NIR"), medium-wavelength infrared ("MWIR") and long-wavelength infrared ("LWIR") bands. However, the invention may also be employed with RADAR, which employs radio frequency waves. Though their mechanism is different, RADARs also have amplitude functions associated with each quadrant of a monopulse antenna that can be correlated with angle. The lobes 1100a-1100d of each quadrant of this four-quadrant structure and a monopulse antenna 1103 are shown in FIG. 11 and again in a cross section in FIG. 12 where two quadrant lobes are shown. Combining quadrants for "left/right", "up/down" with normalization by the usual sum yields the same result as the optical analogue disclosed above as the window reconstruction curve. Using the difference pattern between quadrants as shown in FIG. 13, provides a sensitivity to angle that can be used with the inventive approach to provide an instantaneous measurement of range in a single time sample. Thus, the invention is not limited to use with optical radiation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for use in determining the range in a single time sample from a platform to a target, comprising:
   receiving radiation emanating from the target at two points on the platform in a common time sample;
   detecting the received radiation and generating a signal representative thereof; and
   processing the signal to:
      determine a respective angle to target from two points on the platform by using a correlation between received signal amplitude and respective angle; and
      determine the range from the platform to the target from the respective angles and the separation distance between said two points in a single signal-to-noise sufficient sample.

2. The method of claim 1, wherein the angles are generated by separate sensors.

3. The method of claim 1, wherein the angles are generated by a combination of sensors.

4. The method of claim 1, wherein receiving the radiation includes receiving optical radiation.

5. The method of claim 4, wherein receiving the optical radiation includes receiving radiation in one of the visible, ultraviolet, near infrared, medium-wavelength infrared, and long-wavelength infrared bands.

6. The method of claim 1, wherein receiving the radiation includes at least one of receiving radiation in the radio frequency band, receiving radiation radiating from the target, and receiving radiation reflected from the target.

7. The method of claim 1, wherein determining the respective angle between each of the two points and the target includes correlating the angular relationships of raw signals through an estimation filter.

8. The method of claim 1, wherein determining the respective angle between each of the two points and the target includes one of determining the respective angles from the Fresnel transmittance of the detection and the detected amplitudes of the received radiation and determining the angles from a look-up table.

9. The method of claim 8, wherein determining the respective angle between each of the two points and the target includes normalizing first and second portions of the signal representative of the radiation received at the first and second points with the sum of the first and second portions.

10. The method of claim 1, wherein determining the respective angle between each of the two points and the target includes determining the respective angles independently of each other.

11. The method of claim 1, wherein determining the respective angle between each of the two points and the target includes:
   determining the respective angles from the Fresnel transmittance of the detection and the detected amplitudes of the received radiation in first and second portions of the signal representative of the radiation received at the first and second points, respectively; and
   normalizing first and second portions with the sum of the first and second portions.

12. The method of claim 1, wherein determining the range from the platform to the target from the respective angles includes:
   making a plurality of range determinations from the platform to the target; and
   filtering the range determinations.

13. The method of claim 1, wherein processing the signal to determine the respective angles includes processing the signal to determine the respective angles in at least one of Cartesian coordinates, quaternion coordinates, polar coordinates, a rotated frame, and unit vectors.

14. The method of claim 1, wherein processing the signal to determine the respective angles includes processing the signal to determine the respective angles from their respective directional cosines.

15. The method of claim 1, wherein receiving the radiation emanating from the target at two points includes receiving the radiation emanating from the target at two points on the platform orthogonal to the body axes.

16. The method of claim 1, wherein receiving the radiation emanating from the target at two points includes receiving the radiation emanating from the target at two points on the platform that are not orthogonal to the body axes.

17. The method of claim 1, wherein receiving the radiation emanating from the target at two points includes receiving the radiation emanating from the target at two points on the platform that are not aligned in a plane.

18. The method of claim 1, further comprising receiving radiation emanating from the target at least an additional point on the platform in the common time sample.

19. The method of claim 18, wherein the three points define non-aligned baselines.

20. The method of claim 1, wherein determining the respective angle between each of the two points and the target includes correlating the angular relationships of the raw signals through an estimation filter.

21. The method of claim 1, wherein determining the respective angle between each of the two points and the target includes correlating the raw signals to angular space in a multi-dimensional relationship.

22. An apparatus for use in determining the range from a platform to a target, comprising:
a receiver capable of receiving radiation emanating from a field of view including the target; and
a plurality of electronics capable of processing the signal to:
determine a respective angle to target from two points on the platform by using a correlation between received signal amplitude and respective angle; and
determining the range from the platform to the target from the respective angles.

23. The apparatus of claim 22, wherein the receiver includes a plurality of optical channels through which the apparatus can receive radiation emanating from the target.

24. The apparatus of claim 23, wherein the optical channels include:
a windowing system through which the radiation is received;
a sensor capable of detecting the received radiation and generating a signal representative thereof; and
a light tube between the windowing system and the sensor.

25. The apparatus of claim 23, wherein the optical channels include at least one of a baffle and a plurality of light tubes.

26. The apparatus of claim 23, wherein the optical channels include at least one of reflector and a filter.

27. The apparatus of claim 22, wherein the receiver is capable of receiving radiation in an optical band.

28. The apparatus of claim 27, wherein the optical band comprises one of the visible, ultraviolet, near infrared, medium-wavelength infrared, and long-wavelength infrared bands.

29. The apparatus of claim 22, wherein the receiver is capable of receiving radio frequency radiation.

30. The apparatus of claim 29, wherein the receiver includes a monopulse RADAR antenna.

31. The apparatus of claim 22, wherein the electronics include:
a processor;
a storage in communication with the processor;
a data structure in which data representative of the received radiation; and
an application that, when invoked by the processor, processes the data to determine the respective angles and the range from the platform to the target.

32. The apparatus of claim 22, further comprising an optical source capable of generating an optical signal into a field of view including the target.

33. An apparatus for use in determining the range from a platform to a target, comprising:
a plurality of optical channels through which the apparatus can receive radiation emanating from the target, the optical channels including:
a windowing system through which the radiation is received;
a sensor capable of detecting the received radiation and generating a signal representative thereof; and
a light tube between the windowing system and the detector; and
a plurality of electronics capable of processing the signal to:
determine a respective angle to target from two points on the platform by using a correlation between received signal amplitude and respective angle; and
determining the range from the platform to the target from the respective angles.

34. The apparatus of claim 33, wherein the optical channels include at least one of a baffle and a plurality of light tubes.

35. The apparatus of claim 33, wherein the optical channels include at least one of reflector and a filter.

36. The apparatus of claim 33, wherein the electronics include:
a processor;
a storage in communication with the processor;
a data structure in which data representative of the received radiation; and
an application that, when invoked by the processor, processes the data to determine the respective angles and the range from the platform to the target.

* * * * *